Patented Dec. 14, 1943

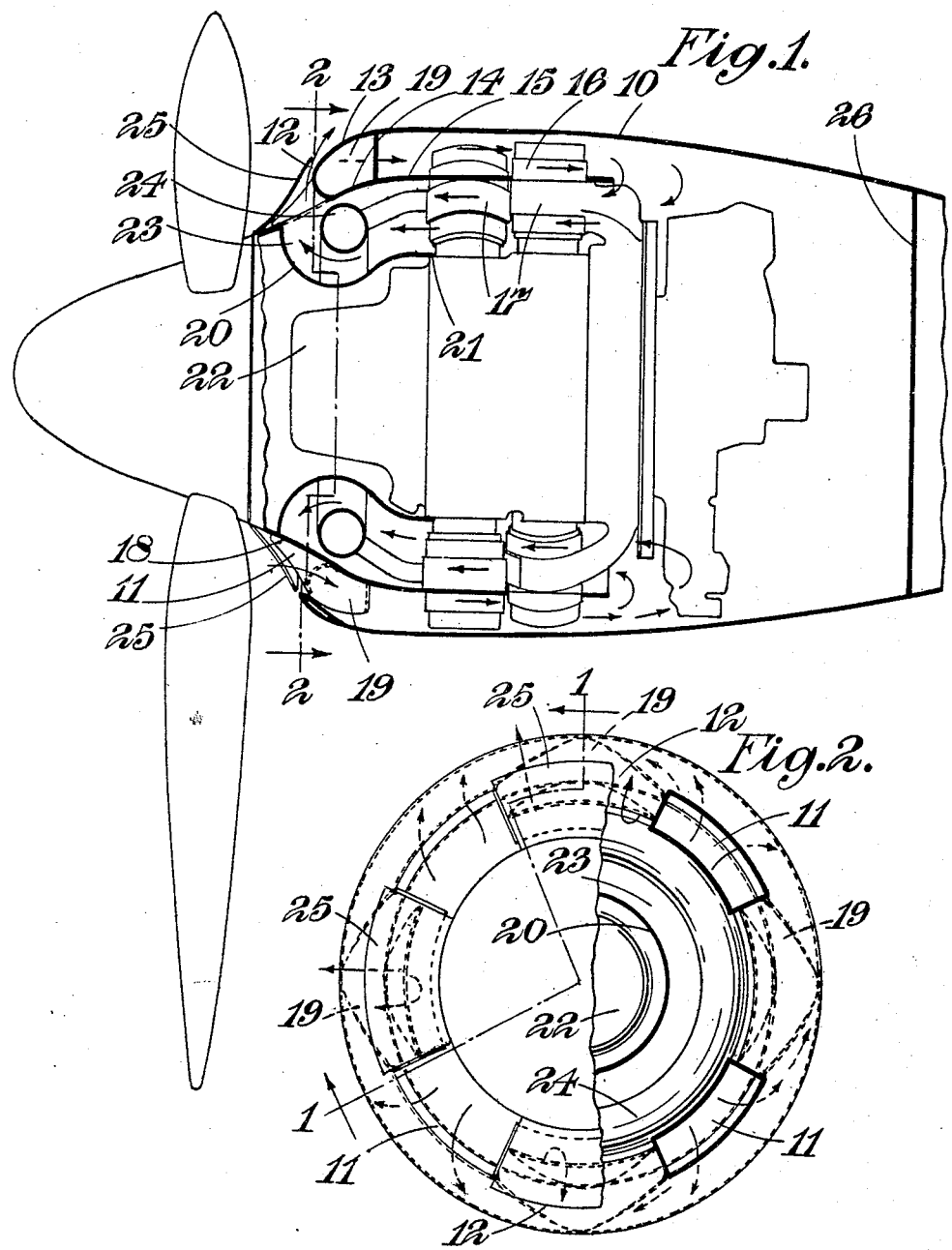

2,336,601

UNITED STATES PATENT OFFICE 2,336,601

COOLING SYSTEM FOR AIR-COOLED INTERNAL-COMBUSTION ENGINES

Alfred Hubert Roy Fedden, Bristol, England, and Frederick Metcalf Thomas, North Adams, Mass., assignors to The Bristol Aeroplane Company Limited, Bristol, England, a British company Application January 14, 1942, Serial No. 426,775
In Great Britain January 17, 1941

1 Claim. (Cl. 123—171)

The invention relates to cooling systems for air-cooled internal-combustion engines such as are used on aircraft and has for its object to provide an improved construction and arrangement whereby effective cooling can be ensured.

The present invention accordingly comprises a cooling system for an air-cooled internal-combustion engine wherein the cooling air is caused to flow in one direction over the heads of the engine-cylinders, and is then reversed in direction to flow over the cylinder-barrels.

The invention is particularly applicable to air-cooled radial internal-combustion engines when used on aircraft, in which case the invention comprises the combination with the engine, of a wrapper which is substantially cylindrical about the crankshaft axis and completely surrounds the engine, a cylindrical partition separating the space around the cylinder-heads from the space around the cylinder-barrels, inlets for admitting cold air to the annular space outside the partition and outlets for discharging heated air from the space inside the partition, said inlets and outlets being arranged in a ring and intercalated with one another.

Specific embodiment of the invention, as applied to an air-cooled radial engine installation, will now be described by way of example with reference to the accompanying drawing, wherein:

Figure 1 is a longitudinal section of an engine-nacelle installation; the section is on the line 1—1 of Figure 2 and the upper half of the figure shows the disposition of the parts for the air outlet and the lower half of the figure the parts for the air-admission, and Figure 2 is a front elevation, partly in section, on the line 2—2 of Figure 1.

Referring to Figures 1 and 2, the cowling of the engine-nacelle is indicated at 10, and its front is divided into eight segments, four of which have air-inlet openings 11, and the other four intercalated with them have outlets 12 for the heated air from the engine. The forward edge 13 of the cowl 10 at each outlet segment is curved inwardly and then rearwardly at 14 to connect with a cylindrical partition 15 which extends rearwardly within the nacelle and separates the cylinder-heads and upper parts of the cylinders 16 from the cylinder-barrels 17. This partition 15 terminates just rearwardly of the cylinders and permits free communication from the annular space around the partition to the space inside the partition.

At the segments having the inlet openings 11 for the cooling air, the partition 15 extends forwardly at 18 to isolate the inflowing streams of air from the outflowing streams of air which come from within the partition 15. This separation is completed laterally by means of plate-members 19 which are of substantially V-shape formation, as shown most clearly in Figure 2, this shaping permitting a divergent flow of the air immediately after it has entered the inlets 11 so as to flow over the whole annular extent of the space outside the partition 15. A further partition 20 of annular formation is provided, as shown in Figure 1, extending from near the front edge of the cowling rearwardly to the engine crankcase to which it is connected at 21; this partition 20 encloses the engine gear-case 22 and provides an annular space 23 which contains the exhaust-ring 24, and it also serves to direct the heated air from the cylinder-barrel 17 forwardly and radially to the outlets 12. These outlets are preferably controlled by means of adjustable flaps 25.

The engine-chamber in the nacelle is sealed by a rear bulk-head 26 which defines the rearward limit of the circulation of air entering outside the partition 15, passing rearwardly and then passing forwardly inside the partition.

With this arrangement, the cold entering air is directed immediately on to the hottest parts of the cylinders and is not preheated by contact with any other part such as the cylinder-barrels or the exhaust-ring. This latter, as shown at 24, is cooled by the air just prior to its leaving the outlets 12.

If desired, controlling flaps may be provided on the air inlets 11 as well as on the outlets 12.

In the arrangement just described, the air both enters and leaves the engine-casing at the front thereof, but it will be appreciated that a similar cooling circuit can be used by introducing the air at the rear end of the engine, in which case the partition 15 would extend forwardly from the bulk-head 26, the air being introduced into the space around the partition, passing forwardly and then inside the partition, to cool the cylinder-barrels, being finally discharged through outlets situated near the bulk-head 26, the inlets and outlets being intercalated with one another in the manner previously described.

We claim:

The combination with an air-cooled radial-cylinder internal-combustion engine having an exhaust ring at one end, of an outer cylindrical casing enclosing the engine and closed at its end remote from the exhaust ring, a coaxial cylindrical partition within the casing which partition terminates short of the closed end of the casing, which divides the space within the casing into an outer annular part around the cylinder-heads and an inner space around the cylinder-barrels and the exhaust-ring, and partitioning means at the open end of the casing which means closes said open end except for a ring of intercalated intake and outlet openings whereof the intake openings communicate with the outer space within the casing and the outlet openings communicate with the inner space within the partition.

ALFRED HUBERT ROY FEDDEN.
FREDERICK METCALF THOMAS.